July 1, 1930.  N. E. GOODRICH  1,769,569
MASSAGING MACHINE
Filed March 25, 1929
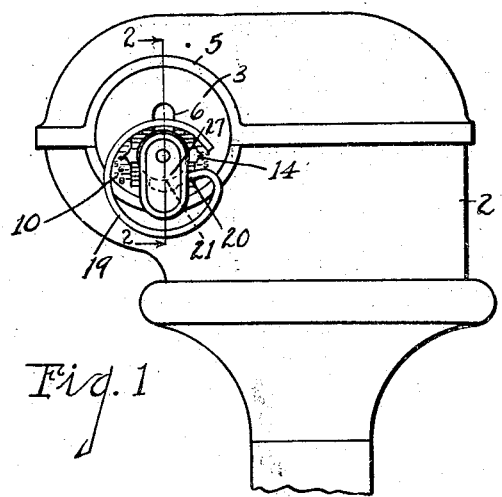
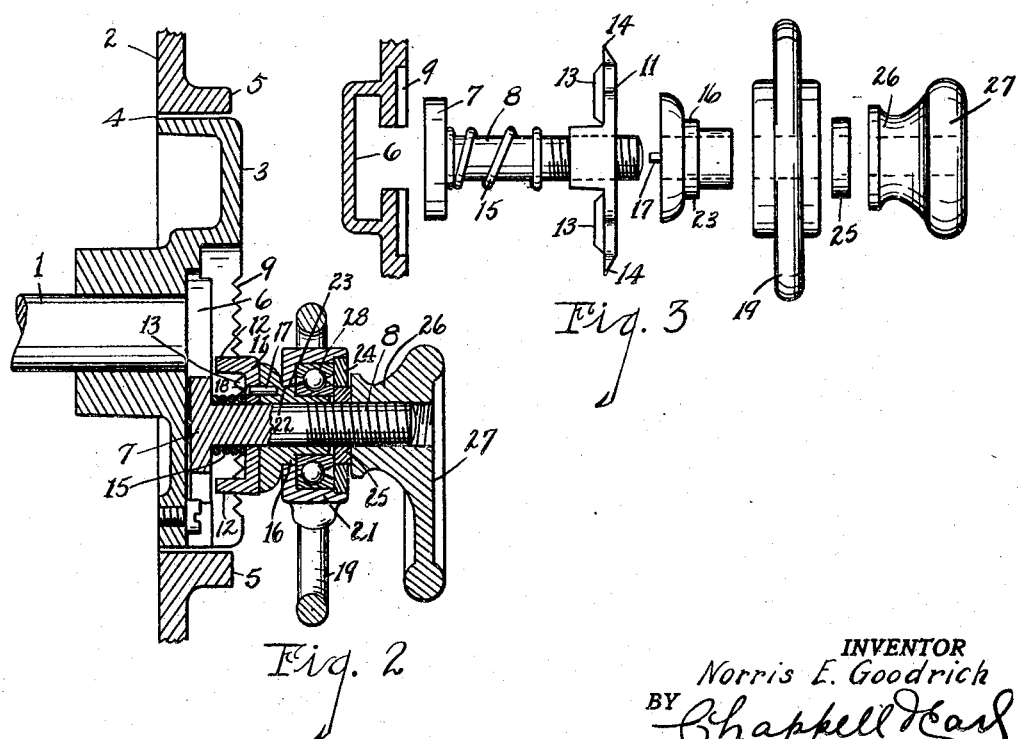
INVENTOR
Norris E. Goodrich
BY Chappell Earl
ATTORNEYS Patented July 1, 1930

1,769,569

UNITED STATES PATENT OFFICE

NORRIS E. GOODRICH, OF BATTLE CREEK, MICHIGAN, ASSIGNOR TO SANITARIUM EQUIPMENT COMPANY, OF BATTLE CREEK, MICHIGAN

MASSAGING MACHINE

Application filed March 25, 1929. Serial No. 349,603.

The main object of this invention is to provide an improved massaging machine in which the stroke may be adjusted quickly and accurately with little effort on the part of the manipulator and is effectively retained in its adjusted positions.

A further object is to provide an applicator attaching means for massaging machines in which the strain upon the parts is minimized in use and there is little likelihood of the applicator becoming entangled.

Objects pertaining to details and economies of my invention will definitely appear from the description to follow. The invention is defined in the claims.

A structure which embodies the features of my invention is clearly illustrated in the accompanying drawing, in which:

Fig. 1 is a fragmentary side elevation of an exercising machine embodying the features of my invention.

Fig. 2 is a detail view mainly in vertical section on line 2—2 of Fig. 1.

Fig. 3 is a detail view with various parts in disassembled relation.

Referring to the drawing, the motor and driving connections therefor to the shaft 1 are disposed within a housing 2. The shaft is provided with a pair of crank disks 3, only one being shown, as the other is a duplicate. This crank disk rotates within an opening 4 in the housing having an outwardly projecting crank disk guarding flange 5.

The crank disk is provided with an undercut radial way 6 engaged by the head 7 of the crank pin 8, the crank pin being slidable in this way. The outer end of the crank pin is threaded.

The face of the crank disk at each side of the way is provided with uniformly spaced serrations 9 having adjustment indicating indicia 10 associated therewith. A clamp 11 is mounted upon the crank pin for longitudinal movement, this clamp being provided with inwardly projecting lugs 12 engaging the way, thereby supporting the clamp against rotative movement.

The clamp is provided with V-shaped teeth 13 coacting with the serrations 9 so that the adjustment of the crank pin can be accurately determined. The clamp is provided with pointers 14 coacting with the indicia 10.

A coiled spring 15 on the crank pin acts to disengage the teeth 13 from the serrations in the crank disk when the clamp is released.

At the outer end of the clamp is a bearing member 16 having a pin 17 engaging a hole 18 in the clamp, thereby preventing rotative movement of the bearing member. This bearing member is shouldered to receive a ball bearing designated generally by the numeral 28.

The applicator attaching hook 19 is curved and substantially annular, that is, substantially a complete circle. Its shank 20 is secured to the side of a supporting hub 21 so that the hook is eccentrically mounted relative to its hub. The hub 21 is chambered to receive the bearing 28 and has an inturned flange 22 at its inner end coacting with a shoulder 23 on the bearing member, and is provided with a closure ring 24 at its outer end. Lying within this closure ring is a thrust ring 25 which engages the inner member of the ball bearing.

The clamping nut 26 is provided with an elongated handpiece 27. This nut engages the thrust ring 25 and through the interposed parts clamps the clamping member in its adjusted positions. The handpiece is preferably arranged so that it alines with the way, the crank pin and parts thereon constituting balancing members; that is, they compensate for the material eliminated in forming the way in the crank disk.

The attaching hook may be eccentrically mounted and always assumes the position shown in Fig. 1 when freed so that the applicators are easily attached and always attached in the right relation. The attaching hook, being substantially offset at its shank, also provides a hand hold so that the hook may be grasped to facilitate the adjustment of the applicator thereto.

By arranging the parts in this relation the load on the crank pin is relatively close to the disk so that the parts are not subjected to undue strain.

I have illustrated and described my improvements in an embodiment which I have found very practical. I have not attempted to illustrate and describe various adaptations and modifications which are possible as it is believed this disclosure will enable those skilled in the art to embody or adapt my improvements as may be desired.

Having thus described my invention what I claim as new and desire to secure by Letters Patent is:

1. In a massaging machine, the combination with a crank disk provided with a radially disposed undercut way and having serrations disposed at the sides of and parallel with said way, said serrations being uniformly spaced and having adjustment indicating indicia associated therewith, a threaded crank pin provided with a head slidable in said way, a clamp mounted on said pin and provided with inturned lugs engaging said way and with teeth coacting with said serrations, said clamp being provided with pointers coacting with said indicia, a coiled spring arranged on said pin at the inner side of said clamp and acting to disengage its teeth from said serrations, a bearing member provided with a ball bearing mounted on said crank pin and having a pin engaging said clamp member to hold the bearing against rotation, a curved substantially annular applicator attaching hook provided with a hub supported by said ball bearing, said hook having an inturned shank secured to the side of the hub whereby the hook is eccentrically supported on the crank pin, and a clamping nut threaded upon the outer end of said crank pin in coacting relation to the bearing for securing the crank pin in its adjusted position on the crank disk.

2. In a massaging machine, the combination with a crank disk provided with a radially disposed undercut way and having serrations disposed at the sides of and parallel with said way, said serrations being uniformly spaced and having adjustment indicating indicia associated therewith, a threaded crank pin provided with a head slidable in said way, a clamp mounted on said pin and provided with inturned lugs engaging said way and with teeth coacting with said serrations, said clamp being provided with pointers coacting with said indicia, a coiled spring arranged on said pin at the inner side of said clamp and acting to disengage its teeth from said serrations, a bearing member on said crank pin, a curved substantially annular applicator attaching hook provided with a hub supported by said bearing, said hook having an inturned shank secured to the side of the hub whereby the hook is eccentrically supported on the crank pin, and a clamping nut threaded upon the outer end of said crank pin in coacting relation to the bearing for securing the crank pin in its adjusted position on the crank disk.

3. In a massaging machine, the combination with a crank disk provided with a radially disposed undercut way and having serrations disposed at the sides of and parallel with said way, said serrations being uniformly spaced and having adjustment indicating indicia associated therewith, a crank pin provided with a head slidable in said way, a clamp mounted on said pin and provided with inturned lugs engaging said way and with teeth coacting with said serrations, said clamp being provided with pointers coacting with said indicia, a bearing member provided with a ball bearing mounted on said crank pin and having a pin engaging said clamp member to hold the bearing against rotation, an applicator attaching hook provided with a hub supported by said ball bearing, and a clamping nut threaded upon the outer end of said crank pin in coacting relation to the bearing for securing the crank pin in its adjusted position on the crank disk.

4. In a massaging machine, the combination with a crank disk provided with a radially disposed undercut way and having serrations disposed at the sides of and parrallel with said way, said serrations being uniformly spaced and having adjustment indicating indicia associated therewith, a crank pin provided with a head slidable in said way, a clamp mounted on said pin and provided with inturned lugs engaging said way and with teeth coacting with said serrations, said clamp being provided with pointers coacting with said indicia, a bearing member on said crank pin, an applicator attaching hook provided with a hub supported by said bearing, and a clamping nut threaded upon the outer end of said crank pin in coacting relation to the bearing for securing the crank pin in its adjusted position on the crank disk.

5. In a massaging machine, the combination with a crank disk provided with a radially disposed undercut way, a crank pin provided with a head slidable in said way, a clamp mounted on said pin and provided with inturned lugs engaging said way, a bearing member provided with a ball bearing mounted on said crank pin and having a pin engaging said clamp member to hold the bearing against rotation, an applicator attaching hook provided with a hub supported by said ball bearing, and a clamping nut threaded upon the outer end of said crank pin in coacting relation to the bearing for securing the crank pin in its adjusted position on the crank disk.

6. In a massaging machine, the combination with a crank disk provided with a radially disposed undercut way, a crank pin provided with a head slidable in said way, a clamp mounted on said pin and provided with inturned lugs engaging said way, a bearing member on said crank pin, an applicator attaching hook provided with a hub supported by said bearing, and a clamping nut threaded upon the outer end of said crank pin in coacting relation to the bearing for securing the crank pin in its adjusted position on the crank disk.

7. In a massaging machine, the combination of a crank disk provided with a radially disposed undercut way, a crank pin provided with a head slidable in said way, a clamp mounted on said pin, a bearing member provided with a ball bearing mounted on said crank pin, a curved substantially annular applicator attaching hook provided with a hub supported by said ball bearing for free rotation, said hook being secured to the hub so that it is supported to embrace the hub and eccentrically relative to the axis of the bearing with the bill of the hook lying adjacent the shank thereof, and a clamping nut threaded upon the crank pin at the outer side of the hub of the hook.

8. In a massaging machine, the combination of a crank disk provided with a radially disposed undercut way, a crank pin provided with a head slidable in said way, a clamp mounted on said pin, a bearing member mounted on said crank pin, a substantially annular applicator attaching hook provided with a hub to which one end of the hook is secured so that the hook embraces the hub, the hub being supported on said bearing for free rotative movement, and a clamping nut threaded upon the crank pin at the outer side of the hub of the hook.

9. In a massaging machine, the combination of a crank disk provided with a crank pin, a bearing member carried by said crank pin, a curved substantially annular applicator attaching hook provided with a hub supported by said bearing for free rotative movement, said hook being secured to the hub to embrace the same and eccentrically relative to the axis of the bearing with the bill of the hook lying adjacent the shank thereof.

In witness whereof I have hereunto set my hand.

NORRIS E. GOODRICH.